United States Patent Office 2,917,398
Patented Dec. 15, 1959

2,917,398
STABILIZED LOWER FATTY ACID ESTERS OF CELLULOSE

Harry W. Coover, Jr., and Willis C. Wooten, Jr., Kingsport, Tenn., assignors to Eastman Kodak Company, Rochester, N.Y., a corporation of New Jersey No Drawing. Application October 9, 1957
Serial No. 689,038

10 Claims. (Cl. 106—169)

This invention relates to stabilized cellulose esters whose stability results from the incorporation therein of a very small percentage of a sulphur compound of a certain type.

Cellulose esters as prepared in the conventional manner from wood pulp or cotton linters tend to discolor when subjected to elevated temperatures and may even experience some chain cleavage. This is a decided disadvantage in the use of these esters in processes in which the cellulose esters are subjected to elevated temperatures such as molding compositions, fabrics, and the like. Various stabilizers have been suggested but a number of the suggested stabilizing materials have been characterized by some undesirable characteristic.

One object of our invention is to provide stabilized cellulose esters which retain both color and chain length stability when subjected to elevated temperatures and which also are of excellent clarity. Another object of our invention is to provide a method for stabilizing cellulose esters utilizing certain organic sulphur compounds. Other objects of our invention will appear herein.

We have found that discoloring in cellulose esters when subjected to elevated temperatures is considerably reduced or eliminated if the cellulose esters are mixed with a very small proportion of a certain type of organic sulphur compound in preparing the composition. The compounds which we have found to be particularly useful for stabilizing cellulose esters have a structure corresponding to one of the following:

H—S—R
R—S—R
R—S—S—R

R being an organic radical. We have found that sulphur compounds in accordance with these formulas will stabilize lower fatty acids of cellulose when incorporated therein in quantities up to 2%. We have found that concentrations of these compounds as low as 0.01% of the cellulose ester have produced stabilization in practice an amount of at least 0.1% is ordinarily desirable.

In the sulphur containing organic compounds employed in accordance with our invention the organic radicals which are joined to the sulphur may vary appreciably. The usual organic radicals, however, are of the hydrocarbon type of either an unsubstituted or substituted nature; for instance, the hydrocarbon radical may have OH, chlorine (halogen), carboxyl, cyano or the like as substituents thereon. Some of the organic radicals employed may be of lower molecular weight but on the other hand organic radicals may be used which contain 8 to 10 or even more (such as up to 18) carbon atoms therein. The following is a list of of compounds representative of the type which are useful as stabilizers for lower fatty acid esters of cellulose in a proportion up to 2% based on the cellulose ester:

Thioglycollic acid
Dilauryl 3,3'-thiodipropionate
Bis(chlorophenylthio) methane
Dithiodiglycollic acid
Mercapto ethanol
Mercapto acetic acid
Methyl mercapto acetate
Dodecyl disulfide
Chlorothiophenol, and the like Our invention applies to the stabilization of cellulose esters of 2–4 carbon atoms either simple or mixed. Some of the esters which may be stabilized in accordance with our invention are cellulose acetate, cellulose acetate butyrate, cellulose isobutyrate, cellulose acetate propionate, cellulose propionate, cellulose butyrate and the like. It is usually desirable that the ester which is stabilized be one that has been manufactured so as to have a sulphur content within the range of 0–.015% and an ash content of no more than .05%. The cellulose esters which have been found to be most suitable for stabilization in accordance with our invention are those which contain 0.0–1.0% hydroxyl groups per C6 unit of cellulose although cellulose esters outside of this range are improved in heat stability by incorporating therein sulphur compounds as specified herein. The total acyl content of the cellulose esters which is stabilized in accordance with our invention is not critical. Stabilized cellulose esters, in accordance with our invention, are susceptible to plasticization by the plasticizers which are recognized as suitable for that purpose. For instance, some plasticizers which are useful for plasticizing cellulose acetate butyrate or cellulose acetate propionate are dibutylsebacate, 2-ethylhexyladipate, di-2-ethylhexylphthalate, dibutyl phthalate and the like. Plasticizers which are useful for plasticizing cellulose actate are dimethyl phthalate, tripropionin, triacetin and the like. Where plasticizers are incorporated with the cellulose ester stabilized in accordance with our invention, it is desirable that those plasticizers also be heat resistant. The stabilizers in accordance with our invention can be made by well-known procedures and are either available from regular commercial sources or are disclosed in the prior literature or both.

The following examples illustrate the use of stabilizers in accordance with our invention for stabilizing various cellulose esters.

Example 1

100 parts of cellulose tripropionate was thoroughly mixed with amounts of stabilizers listed below in a rolling operation. Buttons of the rolled material were then made in a button mold at 230° C. and 2,000 p.s.i. pressure. The color of the button obtained is a measure of the stability obtained.

| Parts of Plasticizer | Stabilizer | Color of Button |
|---|---|---|
| 1. 0.5 | Mercapto acetic acid | Light yellow. |
| 2. 0.5 | Mercapto ethanol | Do. |
| 3. 0.5 | Dithiodiglycollic acid | Yellow. |
| 4. 0.5 | Methyl mercapto acetate | Light yellow. |
| 5. 0.5 | 1-dodecanethiol | Yellow. |
| 6. 0.5 | Dodecyl disulfide | Do. |
| 7. 0.5 | Bis chlorophenol thiomethane | Do. |
| 8. 0.5 | Chlorothiophenol | Light yellow. |
| 9. 0.1 | do | Yellow. |
| 10. 0.05 | do | Brown. |
| 11. | None | Dark Brown. |

Example 2

100 parts of the cellulose ester indicated was rolled with the amount of plasticizer indicated below and 0.5 parts of chlorothiophenol. Buttons were molded at the indicated temperature. Each cellulose ester was then formed into a button in exactly the same manner except that the sabilizer was omitted. The results were as follows:

| Number | Cellulose Ester | Acyl Content | Parts of Plasticizer | Plasticizer | Color of Button with Stabilizer | Color of Button without Stabilizer | Molding Temperature, °C. |
|---|---|---|---|---|---|---|---|
| 1 | Cellulose acetate | 39% | 30 | Dibutyl phthalate. | Light yellow | Brown | 200 |
| 2 | do | 44.5% | 30 | Triethyl phosphate. | Yellow | Dark Brown | 320 |
| 3 | Cellulose propionate | 48% | | | Light yellow | Brown | 230 |
| 4 | do | 40% | | | do | Dark yellow | 200 |
| 5 | Cellulose isobutyrate | 55% | | | do | Yellow | 210 |
| 6 | Cellulose butyrate | 45% | | | Yellow | Dark brown | 250 |
| 7 | Cellulose acetate-butyrate. | 13% acetyl / 40% butyryl | 20 | Dibutyl phthalate. | do | do | 250 |

We claim:

1. A cellulose ester, the acyl of which essentially consists of a fatty acid radical of 2–4 carbon atoms, containing 0.01–2% of a sulfur stabilizer selected from the group consisting of monomers having the following formulae: H—S—R, R—S—R, R—S—S—R, R being a radical selected from the group consisting of the unsubstituted and substituted hydrocarbon radicals of not more than 18 carbon atoms.

2. A cellulose ester, the acyl of which essentially consists of fatty acid radicals of 2–4 carbon atoms, containing as a stabilizer therein 0.01–2% of a monomer having the formula H—S—R, R being a radical selected from the group consisting of the unsubstituted and substituted hydrocarbon radicals of not more than 18 carbon atoms.

3. A cellulose ester, the acyl of which essentially consists of fatty acid radicals of 2–4 carbon atoms, containing as a stabilizer therein 0.01–2% of a monomer having the formula R—S—R, R being a radical selected from the group consisting of the unsubstituted and substituted hydrocarbon radicals of not more than 18 carbon atoms.

4. A cellulose ester, the acyl of which essentially consists of fatty acid radicals of 2–4 carbon atoms, containing therein as a stabilizer 0.01–2% of a monomer having the formula R—S—S—R, R being a radical selected from the group consisting of the unsubstituted and substituted hydrocarbon radicals of not more than 18 carbon atoms.

5. A cellulose ester, the acyl of which essentially consists of fatty acid radicals of 2–4 carbon atoms, containing therein as a stabilizer 0.01–2% of chlorothiophenol.

6. A cellulose ester, the acyl of which essentially consists of fatty acid radicals of 2–4 carbon atoms, containing therein as a stabilizer 0.01–2% of mercapto ethanol.

7. A cellulose ester, the acyl of which essentially consists of fatty acid radicals of 2–4 carbon atoms, containing therein as a stabilizer 0.01–2% of mercapto acetic acid.

8. A cellulose ester, the acyl of which essentially consists of fatty acid radicals of 2–4 carbon atoms, containing therein as a stabilizer 0.01–2% of methyl mercapto acetate.

9. Cellulose acetate containing therein 0.01–2% of chlorothiophenol.

10. Cellulose acetate butyrate containing therein 0.01–2% of chlorothiophenol.

References Cited in the file of this patent

UNITED STATES PATENTS

| | | |
|---|---|---|
| 2,465,914 | Myles | Mar. 29, 1949 |
| 2,465,915 | Myles et al. | Mar. 29, 1949 |
| 2,484,369 | Ballard et al. | Oct. 11, 1949 |